(12) United States Patent
Enicks et al.

(10) Patent No.: US 7,044,147 B2
(45) Date of Patent: May 16, 2006

(54) SYSTEM, APPARATUS AND METHOD FOR CONTAMINANT REDUCTION IN SEMICONDUCTOR DEVICE FABRICATION EQUIPMENT COMPONENTS

(75) Inventors: Darwin G. Enicks, Colorado Springs, CO (US); Carl E. Friedrichs, Colorado Springs, CO (US); Richard A. Brucher, Divide, CO (US)

(73) Assignee: Atmel Corporation, San Jose, CA (US)

(*) Notice: Subject to any disclaimer, the term of this patent is extended or adjusted under 35 U.S.C. 154(b) by 216 days.

(21) Appl. No.: 10/801,435

(22) Filed: Mar. 15, 2004

(65) Prior Publication Data

US 2005/0199284 A1    Sep. 15, 2005

(51) Int. Cl.
*F16K 11/00* (2006.01)
(52) U.S. Cl. ............................ 137/1; 137/240; 137/883; 137/565.01
(58) Field of Classification Search ................ 137/240, 137/883, 1, 565.01
See application file for complete search history.

(56) References Cited

U.S. PATENT DOCUMENTS

| | | | |
|---|---|---|---|
| 3,888,518 A | 6/1975 | Delessert | 285/39 |
| 4,352,532 A | 10/1982 | Hardin | 339/15 |
| 4,383,547 A * | 5/1983 | Lorenz et al. | 137/240 |
| 4,437,479 A | 3/1984 | Bardina et al. | 134/68 |
| 4,852,516 A | 8/1989 | Rubin et al. | 118/715 |
| 5,137,047 A * | 8/1992 | George | 137/240 |
| 5,449,294 A | 9/1995 | Rench et al. | 437/225 |
| 5,453,124 A | 9/1995 | Moslehi et al. | 118/715 |
| 5,881,476 A | 3/1999 | Strobush et al. | 34/451 |
| 5,992,463 A | 11/1999 | Redemann et al. | 137/884 |
| 6,099,599 A | 8/2000 | Wu | 29/25.01 |
| 6,199,255 B1 | 3/2001 | Wang et al. | 29/239 |
| 6,325,886 B1 | 12/2001 | Harris et al. | 156/314 |
| 6,349,744 B1 | 2/2002 | Grosshart | 137/884 |
| 6,442,867 B1 | 9/2002 | Pressnall et al. | 34/410 |
| 6,598,279 B1 | 7/2003 | Morgan | 29/402.08 |
| 6,607,605 B1 | 8/2003 | Tan | 134/3 |

* cited by examiner

*Primary Examiner*—Kevin Lee
(74) *Attorney, Agent, or Firm*—Schneck & Schneck; Thomas Schneck; Gina McCarthy

(57) ABSTRACT

A system, apparatus, and method for reducing contaminants of semiconductor device fabrication equipment components, featuring a manifold having a passageway in fluid communication with to a plurality of inlets and for providing a purge fluid to removably connected components to undergo contaminant reduction. The inlets are connected to a plurality of manifold valves to which components are removably connected. The manifold valves are operable to place connected components into and out of fluid communication with the inlets and the passageway. A fluid source supplies purge fluid to the manifold and a pump is connected to the manifold to remove fluid from the system. In one embodiment an oven is connected to the system for outgassing and for reduction of moisture in additional components.

80 Claims, 9 Drawing Sheets

Fig._1

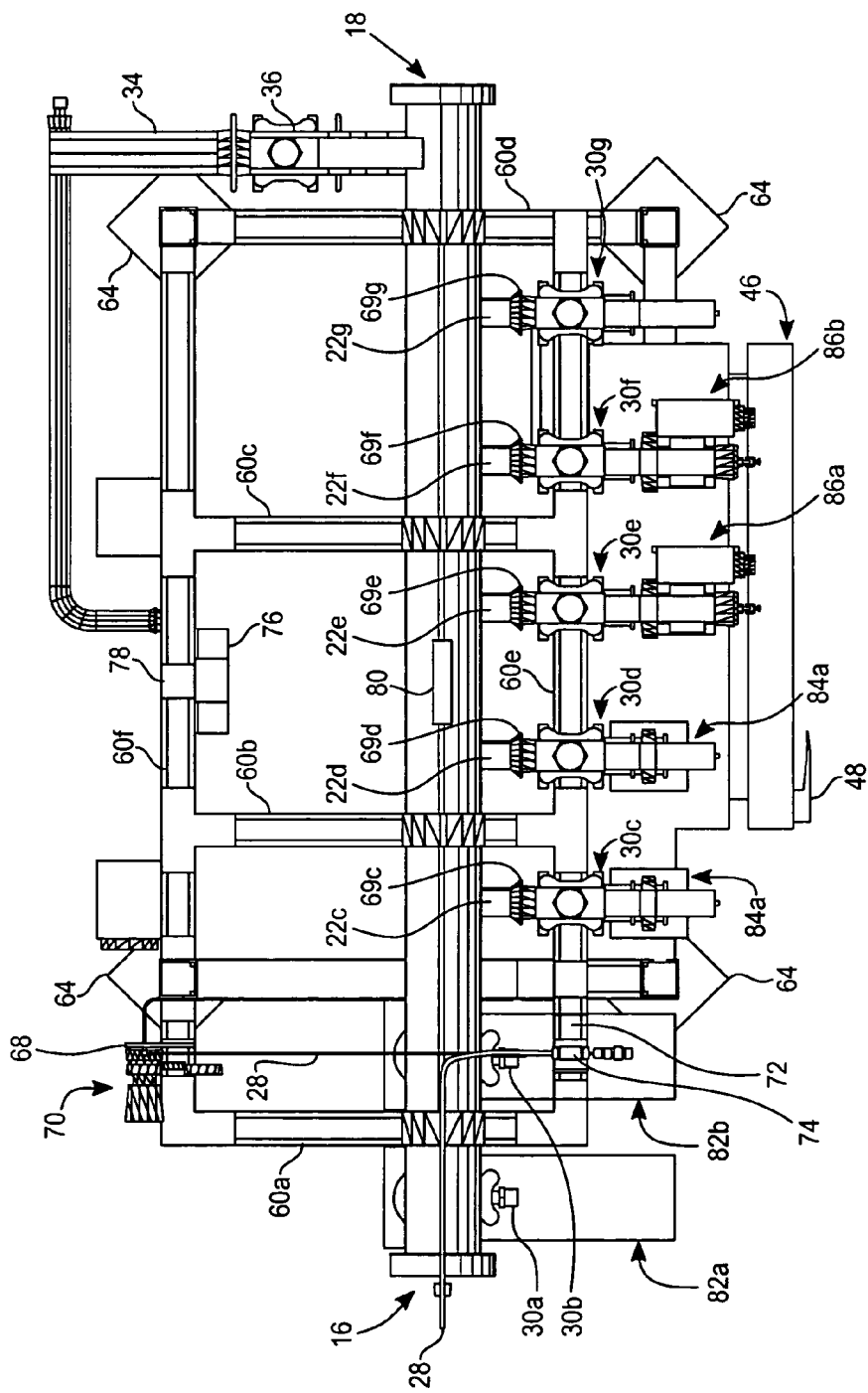
Fig._3

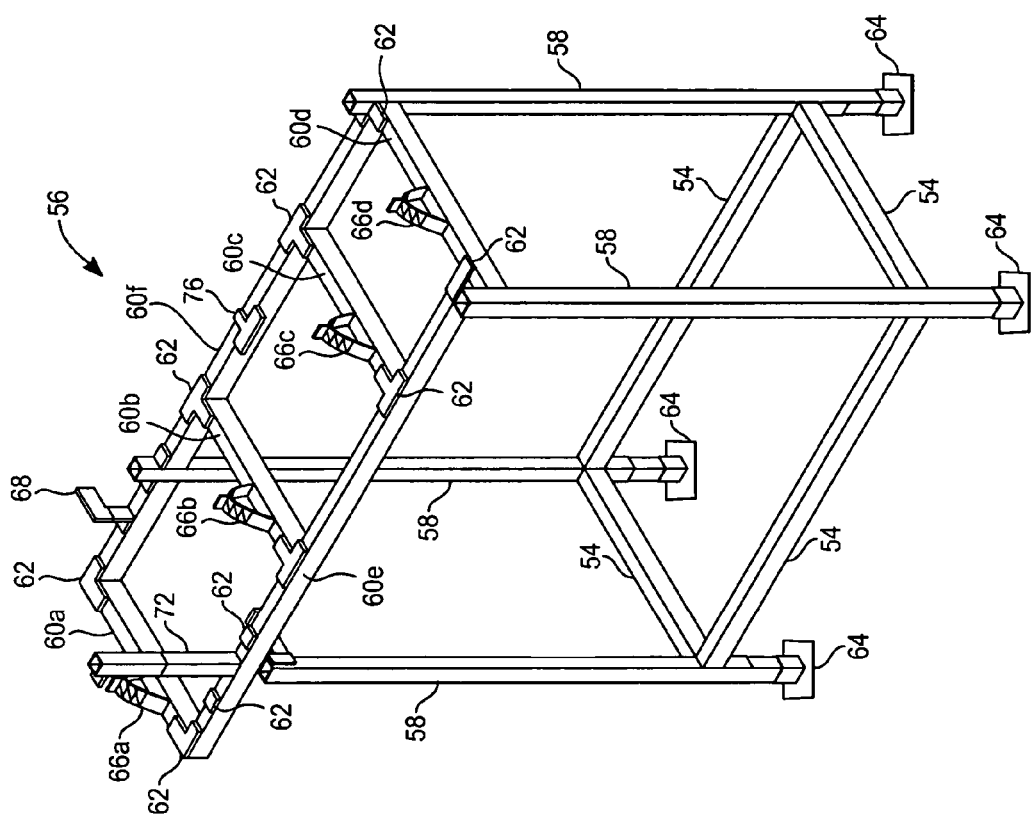
Fig._4

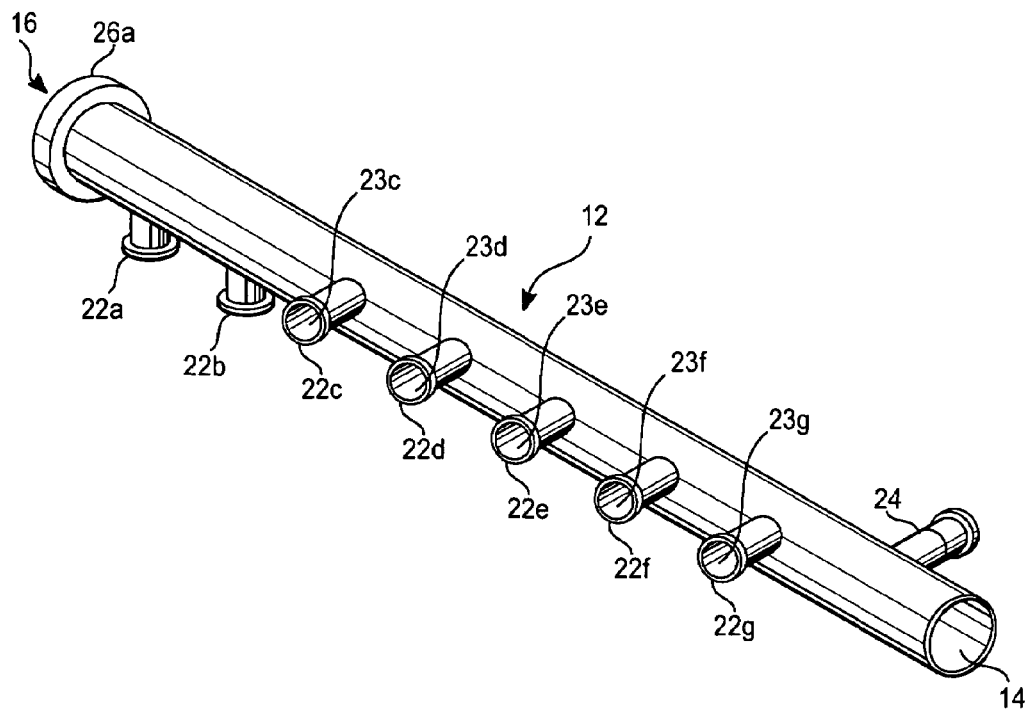
*Fig._5a*
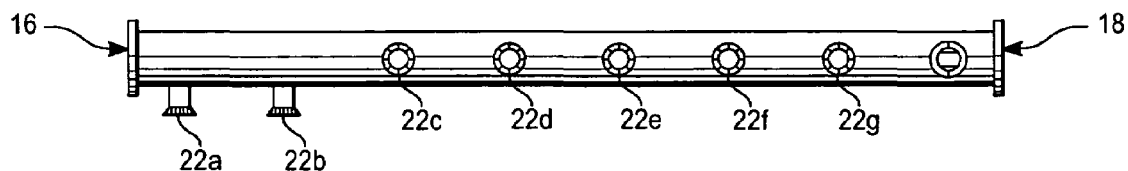
*Fig._5b*
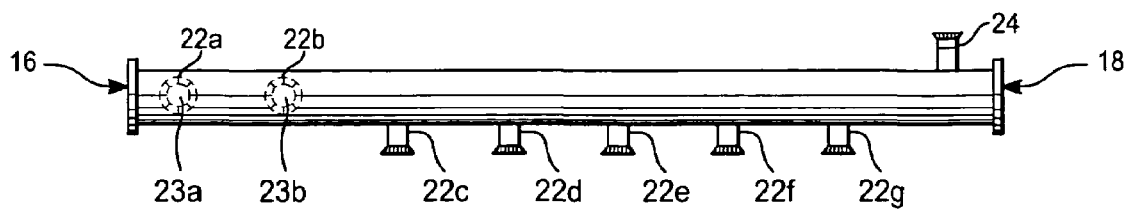
*Fig._5c*

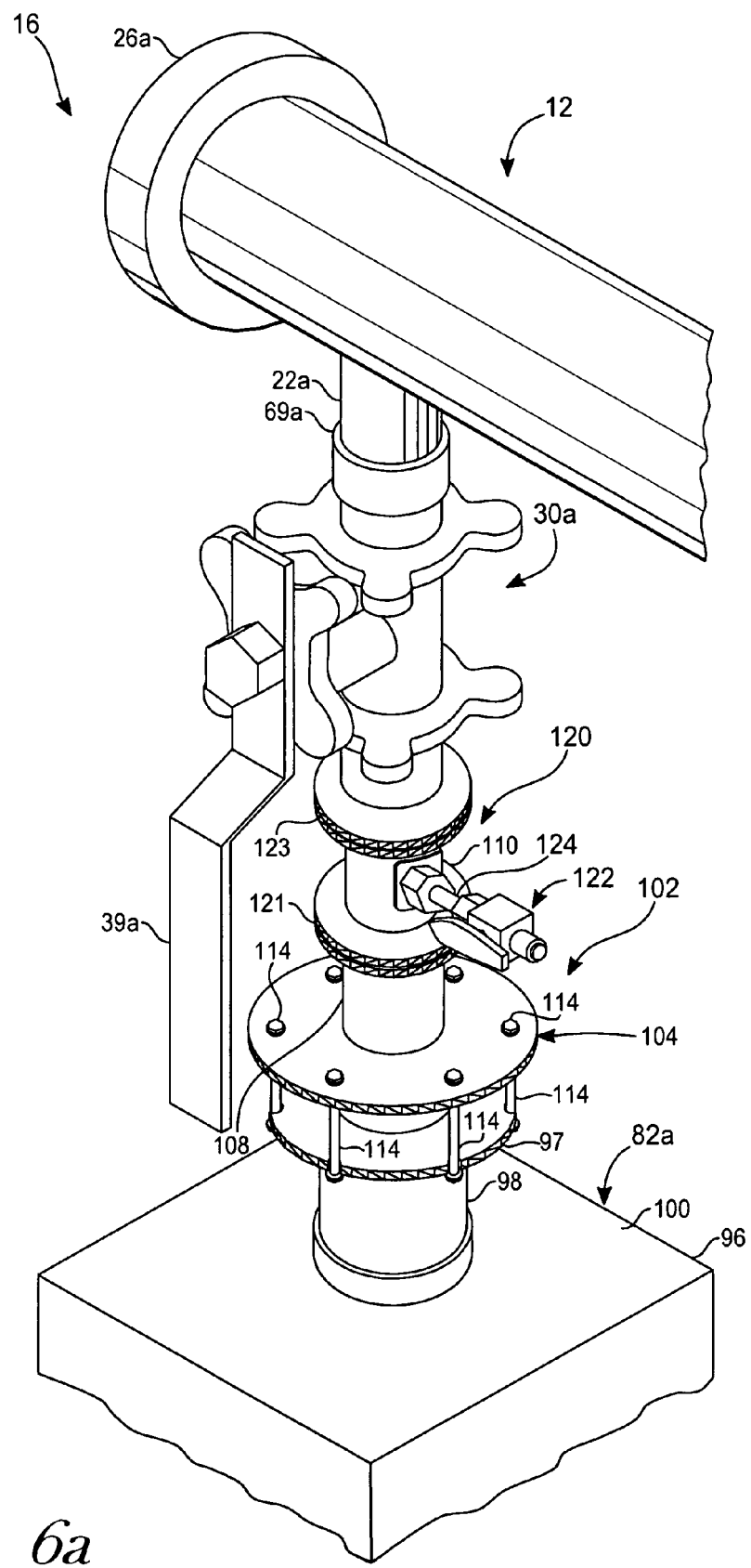
Fig._6a

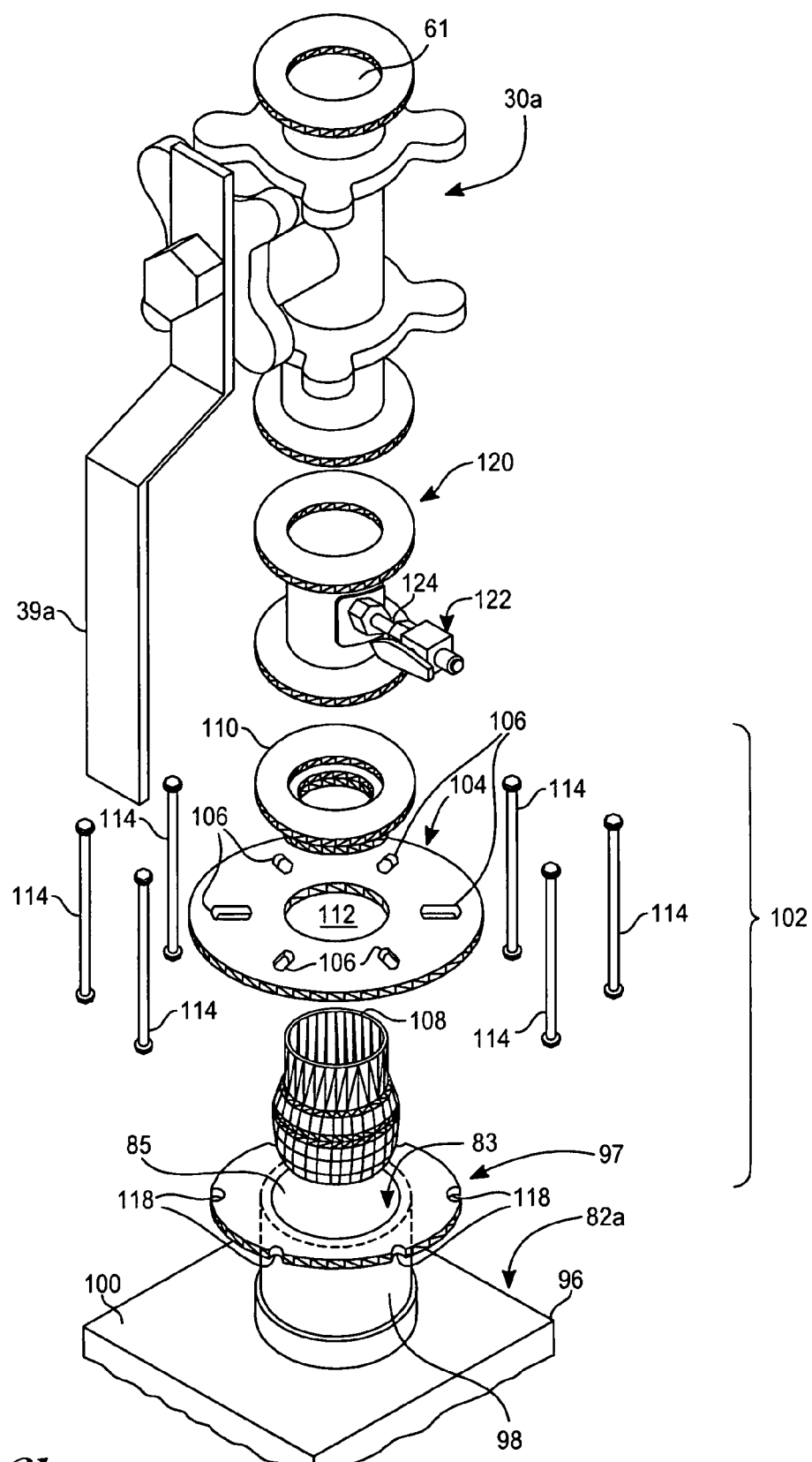
Fig._6b

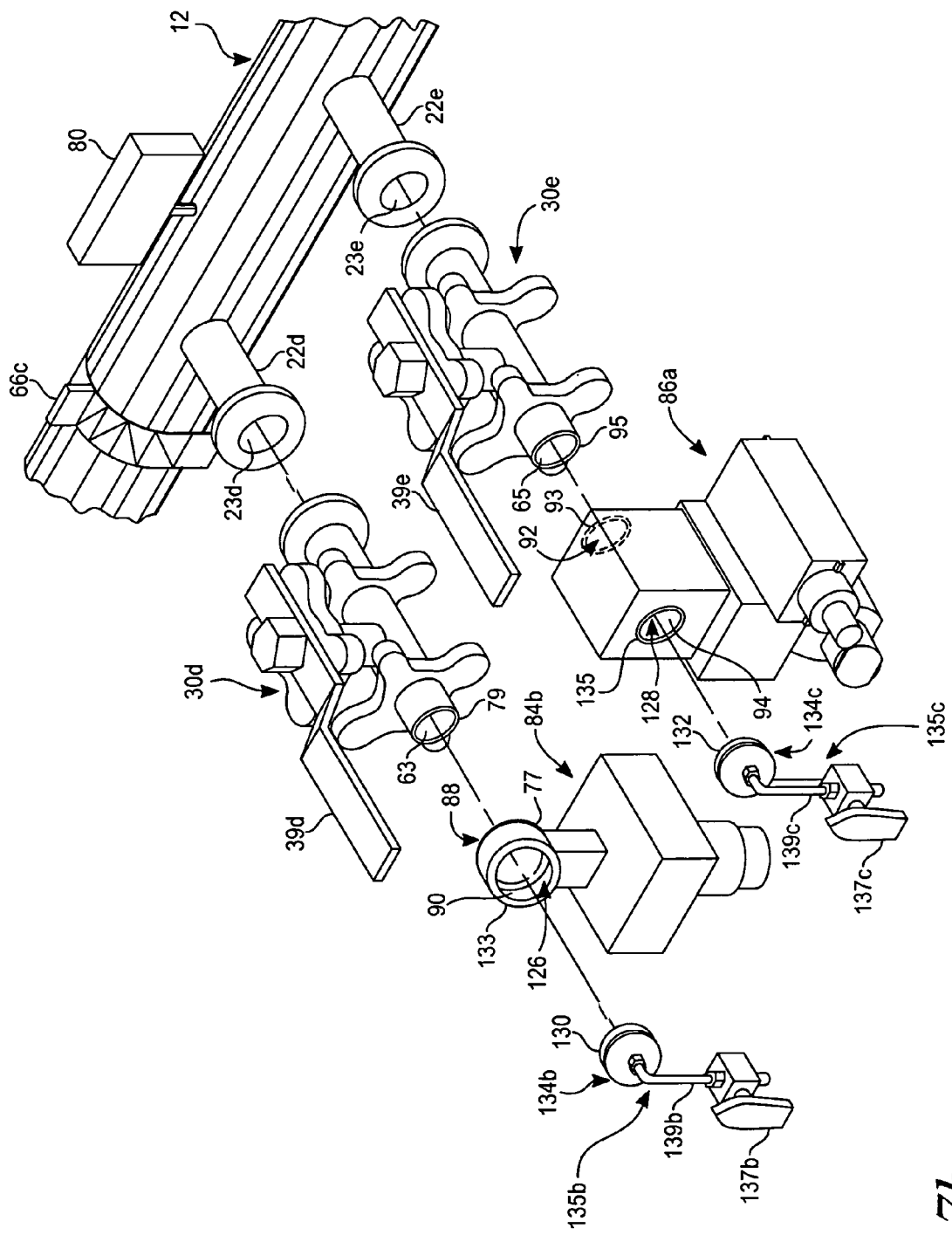
Fig._7b

SYSTEM, APPARATUS AND METHOD FOR CONTAMINANT REDUCTION IN SEMICONDUCTOR DEVICE FABRICATION EQUIPMENT COMPONENTS

FIELD OF THE INVENTION

The invention relates to semiconductor device fabrication equipment in general, and, in particular, to a system, apparatus, and method for contaminant reduction of semiconductor device fabrication equipment components.

BACKGROUND OF THE INVENTION

Semiconductor device fabrication equipment components tend to accumulate contaminants, through for example, adsorption and absorption, before, during, and/or after the operation of the fabrication equipment. Such contaminants include, for example, moisture, oxygen, atmosphere, or any other gases. Possible contaminant sources are process gases as well as the atmosphere. Even components that have been cleaned, by cleaning processes known in the art, or that are new, are subject to accumulation of contaminants. Thus, the components of the semiconductor device fabrication equipment become a source of contaminants, in addition to process gases. Contaminants on components are undesirable for at least the reasons that they degrade the quality of the fabricated semiconductor device manufactured and reduce the efficiency of the fabrication process.

Where the method of semiconductor device fabrication involves depositing epitaxially-grown silicon germanium (SiGe) on a silicon substrate in a chemical vapor deposition (CVD) reactor, during SiGe deposition, oxygen present in the CVD reactor is typically incorporated into the SiGe film. Elevated oxygen levels present in the CVD reaction chamber used to deposit SiGe causes numerous problems in the SiGe films produced in the CVD reactor chamber. Among these problems are elevated sheet resistance of the SiGe p-type base and poor crystal quality.

Additionally, as the amount of absorbed or adsorbed contaminants, such as oxygen, increases, the amount of time for which the reactor must be taken offline typically increases in order to achieve acceptable oxygen levels in SiGe films. While the reactor is offline, it is disassembled to remove contaminants, reassembled, and then tested. The longer the reactor is offline, the less cost effective manufacturing becomes, as an offline reactor cannot be used for manufacturing semiconductor chips.

Also, elevated contaminant levels in the reactor components may lead to early reactor failure and a decreased reactor lifetime.

Therefore, it is an object of the present invention to provide a system, method, and apparatus for reduction or elimination of contaminants found in semiconductor device fabrication equipment components.

It is another object of the present invention to reduce or eliminate levels of contaminants on semiconductor device fabrication equipment components.

It is a further object of the present invention to improve the quality of semiconductor devices manufactured with semiconductor device fabrication equipment.

Additional objects of the present invention are to reduce preventative maintenance recovery time, process recovery time, and mean time to repair (MTTR) and to increase mean time between interrupt (MTBI) and mean time between cleans (MTBC).

SUMMARY OF THE INVENTION

The above and other objects have been met with a method, system, and apparatus each of which, in one exemplary embodiment, feature a manifold which associates a plurality of components together so that they may be selectively placed into and out of fluid communication with fluid, such as a purge fluid, introduced into a main passageway for reducing the amount of contaminants present on surfaces of the components. The purge fluid may include a gas selected from a variety of different types of gases, including nitrogen. The purge fluid may be inert. The manifold has a pair of capped ends, a main passageway, a plurality of inlets in fluid communication with the main passageway, manifold valves connected to the plurality of inlets to which semiconductor device fabrication equipment components are connectable, and an exhaust fitting connected to the manifold at a location downstream from the inlet closest to the capped end. In the system, one of the capped ends is connected to a fluid source and the exhaust fitting is connected to a pump which pumps fluid introduced into the manifold out of the manifold under vacuum. The term vacuum, as referred to in the description of the present invention, means a low pressure environment.

In one embodiment, the system and apparatus further include caps which are connectable to the manifold valves and to a type of component to undergo contaminant reduction having a pair of openings. When a component having two openings, such as a ball valve or a pressure control valve, is connected to a manifold valve for contaminant reduction, one end of the component is connected to the manifold valve at an end having a first opening and the other end of the component having a second opening is capped with a cap to maintain the vacuum within the manifold by preventing atmospheric particles from entering the component and manifold. When the component is a rotation assembly, one end of the rotation assembly including an opening is connected to the manifold valve, while the other end is typically already closed and thus does not require a cap. When a component is not connected to a particular manifold valve, an uncovered manifold valve opening may be capped to maintain the vacuum within the system when the valve is in an open position.

Cap valves may be connected to the caps. When the manifold is in use, a vacuum typically exists within the system. When components are to be removed from the manifold, the cap valve is opened to slowly let air into the component and to vent the component out to atmosphere.

In another embodiment, the system includes an oven connected to the pump for outgassing components of semiconductor device fabrication equipment.

In operation, a purge fluid, such as nitrogen gas, is introduced into the manifold. Nitrogen gas, in particular nitrogen gas introduced in a vacuum, assists in the removal of oxygen from surfaces of the components. Components to undergo contaminant reduction are connected to the manifold valves. In one example, three sets of components (each set including, for example, two of the same type of component and each component having at least one opening) are connected to the manifold valves at the openings. For instance, two rotation assemblies, two ball valves, and two pressure control valves are connected to manifold valves of the system. The inlets of the manifold may be facing downwardly for connection to a manifold valve to which a rotation assembly is to be connected, or frontwardly for connection to a manifold valve to which a ball valve or pressure control valve is to be connected. As stated above, the manifold valves and components may be capped to maintain the vacuum within the system. Fluid is introduced into the main passageway of the manifold and is dispersed to inner surfaces of components via the manifold inlets and connected manifold valves which are in the open position. Fluid is pumped out of the components, inlets, and manifold valves through the exhaust pipe connected to the pump. While the components are undergoing contaminant reduction, additional components may be disposed within the oven for outgassing. When the components have undergone contaminant reduction, they are removed from the system and are ready for use.

The apparatus and system of the present invention is advantageous in at least that it reduces the amount of contaminants, such as oxygen, found on surfaces of semiconductor device fabrication equipment components. A reduction in oxygen within the components will result in an improvement in the quality of semiconductor devices manufactured by the equipment.

Furthermore, the present invention may reduce contaminants of more than one component and more than one type of component at a time. These components may be connected to the manifold valves, found within the oven, or both.

Additionally, reduction of contaminants on components, with the system, apparatus, and method of the present invention, makes future removal of contaminants easier to achieve. Therefore, preventative maintenance recovery time, process recovery time, and mean time to repair (MTTR) are reduced. Further, mean time between interrupt (MTBI) of operation and mean time between cleans (MTBC) will increase as the semiconductor fabrication device equipment will not need to be maintained as often if contaminant reduction has been achieved with the present invention.

The system and apparatus of the present invention may be utilized in conjunction with semiconductor device fabrication equipment components for several different types of semiconductor processes including, for example, SiGe, EPI, thin film, diffusion, etch, and implant processes.

BRIEF DESCRIPTION OF THE DRAWINGS

FIG. 3 is a top view of a portion of the system of FIG. 1.

FIG. 4 is a perspective view of a frame of the system of FIG. 1.

FIG. 5a is a perspective view of a manifold of the system of FIG. 1.

FIG. 5b is a front view of the manifold of FIG. 2a.

FIG. 5c is a top view of the manifold of FIG. 2b.

FIG. 6a is a partial perspective view of the system of FIG. 1.

FIG. 6b is an exploded view of FIG. 6a.

FIG. 7b is an exploded view of FIG. 7a.

DETAILED DESCRIPTION OF THE INVENTION

Figure 1:
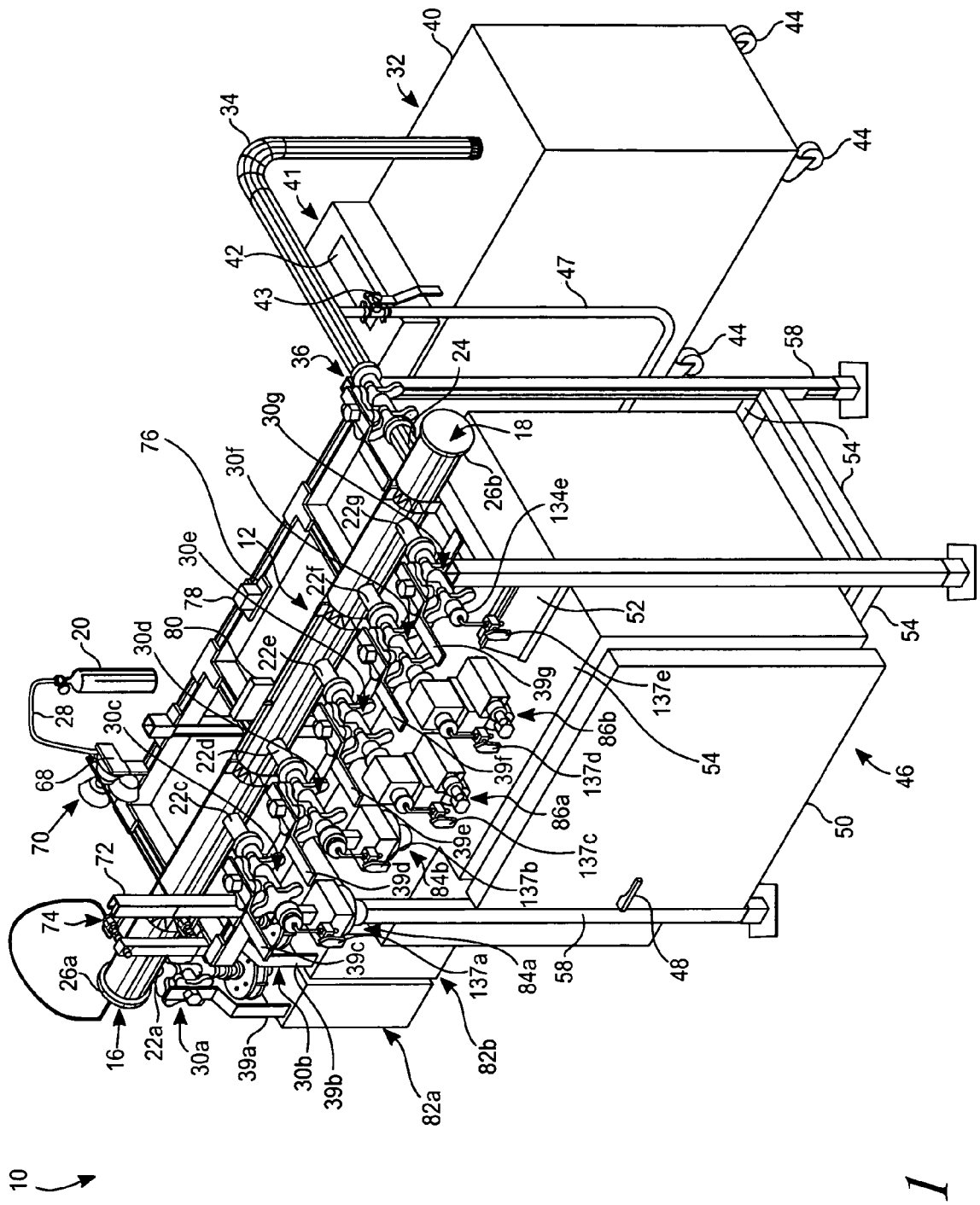
FIG. 1 is a perspective view of the system of the present invention.

With reference to FIG. 1, the system 10 of the present invention is seen featuring a manifold 12. Referring to FIG. 1 and FIGS. 5a–c, the manifold 12 is, for example, a stainless steel pipe, having a length of, for example, 178 cm (70⅛ inches). The manifold 12 includes a main internal passageway 14 capped with first and second capped ends 16 and 18 (cap 18 is not shown in FIG. 5a), the first capped end 16 appearing as capped end 18 except for having an opening (not shown) connected to a fluid source 20, a plurality of inlets 22a–22g disposed in between the capped ends 16 and 18 and in fluid communication with the main passageway 14, and an exhaust fitting 24 disposed proximate to the second capped end 18 and downstream from the plurality of inlets 22a–22g, the exhaust fitting 24 being in fluid communication with the main passageway 14 and the inlets 22a–22g. Capped end 16 includes flange 26a and capped end 18 includes flange 26b. For example, flanges 26a and 26b are NW100 flanges. In one example, each inlet 22 is approximately 5 cm (2 inches) long and has a flange, for example an NW40 flange, that has an opening that is approximately 4 cm (1.6 inches) in diameter. In one example, the exhaust fitting 24 is approximately 8.9 cm (3½ inches) long and has an opening that is approximately 5 cm (1.97 inches) in diameter. Fluid source 20 is connected to the opening of the first capped end via fluid supply line 28.

Figure 2:
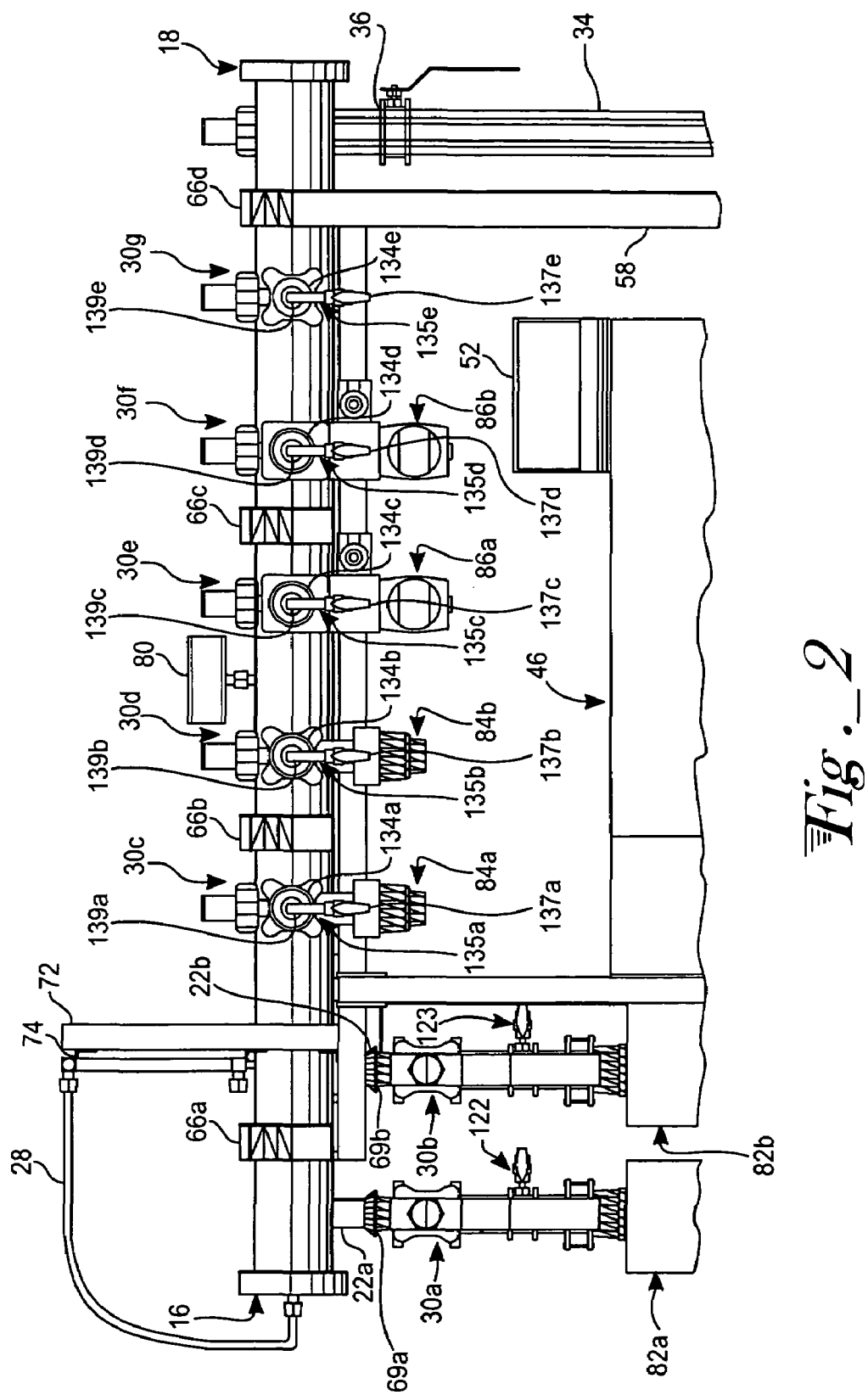
FIG. 2 is a front view of a portion of the system of FIG. 1.

Referring to FIGS. 1–3, a plurality of manifold valves 30a–30g is connected to the manifold inlets 22a–22g respectively. Manifold valves 30a–30g may be connected to inlets 22a–22g via flange connections, or flange joints, 69a–69g (FIGS. 2 and 3). Manifold valves have handles 39a–39g (FIG. 1) which are operated to place the manifold 12 and connected components into and out of fluid communication with the inlets 22 and main passageway 14. The manifold valves 30 are, for example, ball valves. Each manifold valve 30 has a first end connected to one of the plurality of inlets 22a–22g and a second end to which a component is removably connected.

Referring to FIG. 1, a pump 32, for example a roughing pump, is connected to the exhaust fitting 24 via a pipe 34. Other pressure reduction means for providing a reduced pressure within the manifold may be used. A pipe valve 36 is operable to place the exhaust fitting 24 into and out of fluid communication with the pipe 34 and pump 32. A primary pump controller 42, for example an EBARA A70W LCD controller (manufactured by Ebara Corp. Fujisawa, Japan) is seen disposed on the pump body 40 as a part of interface box 41. Wheels 44, which assist in transport of the pump 32, are connected to the pump body 40. A secondary pump controller 52, for example an EBARA A70W LCD controller, is disposed on a top surface 54 of the oven 46. A user may choose to control the pump through the primary or secondary controller.

In one embodiment, the system includes an oven 46 connected to the pump 32 via pipe 47. The oven 46 is, for example, a vacuum drying and outgassing oven. One example of the oven is manufactured by Oven Technology Incorporated (Albuquerque, N. Mex.). The oven 46 includes handle 48 for opening oven door 50 to the oven chamber (not shown). The oven also includes a controller, not shown here. Semiconductor fabrication equipment components, such as o-rings and internal chamber components comprising quartz, stainless steel, or silicon carbide (not shown), are placed within the chamber of the oven for drying and outgassing. The oven 46 is connected to pump 32 via pipe 47 which, in turn, is connected to pipe 34. Pipe 47 includes valve 43 for placing the oven into and out of fluid communication with the pump 32. The oven is supported by base elements 54 forming a part of a frame 56 (FIG. 4).

With reference to FIG. 4, the exemplary frame 56 further includes pillars 58 and frame elements 60. Frame elements 60a–60f are connected via connection elements 62. In one example, connection elements are bolts. The frame 56 is, for example steel. Steel such as treated steel, including galvanized steel or Unistrut® (manufactured by Unistrut, Wayne, Mich.) may be used. Feet 64, located beneath the pillars 58, assist in distributing the load of the system 10. The manifold 12 is inserted within stirrups 66a–66d connected to frame elements 60a–60d, respectively. The stirrups 66 support the manifold 12. In one example, the frame 56 is 143 cm (56⅜ inches) high, 56 cm (22⅛ inches) wide, and 139 cm (54¾ inches) long. At the widest point the frame 56 is, for example, 67 cm (26 3/16 inches) wide. In one example, the stirrups 66 are disposed 29 cm (11 7/16 inches) from frame element 60e measured from a center print of the stirrup. Other frame dimensions may be used.

With reference to FIGS. 1 and 4, bracket 68 is utilized to support a flow regulator 70 (FIG. 1) which regulates the pressure of the fluid transported from the fluid source 20. In one example, the flow regulator 70 is a TESCOM 64-2600 series regulator (manufactured by Tescom Corp., Elk River, Minn.). A column 72 (FIG. 1) is used to support a flow controller 74 which regulates the fluid flow. In one example, the column 72 has a height of approximately 37.5 cm (14¾ inches). The fluid source 20 is connected to the flow regulator 70 via supply line 28. The flow regulator 70 is connected to the flow controller 74 via supply line 28 which is, for example, connected in series. The supply line 28 is connected to the opening of the capped end 16. Bracket 76 supports a Mini Convectron® power supply 78 (manufactured by Granville Phillips, Longmont, Colo.). The Mini Convectron Module 80, which measures the pressure of the manifold 12, is disposed on the manifold 12.

With reference to FIGS. 5a–5c, the manifold inlets 22a–22g are spaced to accommodate various types and sizes of semiconductor device fabrication equipment components. For example, inlets 22a–22g may be spaced apart to allow for connection of different types of components. In one example, inlets 22a and 22b are spaced apart by approximately 25.4 cm (10 inches), measured from a center point of each of the inlets. Such spacing allows for connection of a pair of semiconductor device fabrication equipment components, such as a pair of rotation assemblies 82a and 82b (FIG. 1), as will be described below. Pairs of inlets, for example, inlets 22b and 22c, 22c and 22d, 22d and 22e, 22e and 22f, and 22f and 22g, are spaced apart by, for example, 22.4 cm (8 13/16 inches), measured from a center point of one inlet of each pair of inlets to a center point of the next inlet of the pair. Spacing between a pair of inlets allows for connection of various components to the respective inlets. With reference to FIG. 1, spacing between inlets 22a and 22b allows for a pair of components, for example, a pair of rotation assemblies 82a and 82b, to be connected to inlets 22a and 22b. Spacing between inlets 22b and 22c allows for a pair of components, for example, rotation assembly 82b and a pressure control valve 84a, to be connected to inlets 22b and 22c, respectively. Spacing between inlets 22c and 22d allows for a pair of components, for example, pressure control valve 84a and a pressure control valve 84b, to be connected to inlets 22c and 22d. Spacing between inlets 22d and 22e allows for a pair of components, for example, pressure control valve 84b and a ball valve control valve 86a, to be connected in inlets 22d and 22e, respectively. Spacing between inlets 22d and 22e allows for a pair of components, for example, ball valve 86a and a ball valve 86b, to be connected to inlets 22d and 22e, respectively. Spacing between inlets 22f and 22g allows for a pair of components to be connected to each inlet, respectively. The example in FIG. 1 depicts pressure control valve 86b connected to inlet 22f and a cap 134e connected to inlet 22g. Instead of the cap, a component could be connected to inlet 22f.

The type of component connected to each inlet may vary. The spacing between inlets should be sufficient to accommodate the desired components. Inlets may be downwardly facing, as are inlets 22a and 22b, or frontwardly facing as are inlets 22c–22g. The spacing and orientation of the inlets 22 assists in the accommodation of one or more sets of components.

One or more components or various sets of components from semiconductor device fabrication equipment may undergo contaminant reduction at a single time. In the example of FIG. 1, three sets of components, each set including two components, namely one of a rotation assembly 82, a pressure control valve 84, and a chamber ball valve 86, are connected to the manifold for contaminant reduction. In the example shown in FIG. 1, downwardly facing inlets 22a and 22b may be dedicated to rotation assembly attachment. However, in the example, components connected to inlets 22c–22g are interchangeable in position at these inlets.

Additional semiconductor device fabrication equipment components having a surface, for example an internal surface, and at least one opening leading to the surface may be connected to the manifold valves to undergo contaminant reduction. The term surface may be used to encompass any surface of the component to undergo contaminant reduction.

Inlet 22a is spaced apart from flange 26a by, for example, 11.7 cm (4⅝ inches) from a center point of the inlet. Inlet 22g is spaced apart by, for example, 26.7 cm (10½ inches) from the flange 26b, measured from a center point of the inlet. Exhaust fitting 24 is spaced apart by, for example 9.68 cm (3 13/16 inches) from flange 26b, measured from a center point of the fitting.

Referring to FIGS. 1–3, six manifold valves 30a–30g are depicted connected to various components. Rotation assemblies 82a and 82b, which are depicted in representational form, are connected to manifold valves 30a and 30b, respectively, at an opening of each of the rotation assemblies leading to an internal surface of the rotation assembly. Rotation assemblies 82a and 82b include the same elements and are connected to the manifold 12 in the same manner, thus the elements and the connection will be explained only with regard to one rotation assembly.

Referring to FIG. 6a, manifold valve 30a is connected to downwardly facing inlet 22a at one end, and to rotation assembly 82a at another end. Downwardly facing inlet 22a assists in the connection of rotation assembly 82a to the manifold valve 30a, as the downwardly facing inlet supports a particular shape of the rotation assembly.

Referring to FIGS. 6a and 6b, rotation assembly 82a includes a rotation assembly body 96. A rotation assembly cup 98 having an opening 83 extending through the cup to an internal surface 85 of the rotation assembly to undergo contaminant reduction, is connected to a top surface 100 of the body 96. Rotation assembly flange 97 is connected to the cup 98.

Still referring to FIGS. 6a–6b, rotation assembly 82a is seen connected to manifold valve 30a via, for example, fitting 120 and ball joint 102. The fitting 120 is connected to the ball joint 102, at one end, and to the manifold valve 30a, at another end, via flange joints 121 and 123, respectively. The fitting 120 is connected to a valve 122 via tubing 124. The ball joint 102 includes a ball joint flange 104 with bolt openings 106, a male connector 108, and flange 110 which is for example, a KF flange. The male connector is inserted, at one end, within opening 83 of rotation assembly cup 98 of rotation assembly 82a. At another end, the male connector 108 is inserted through ball joint flange opening 112 and flange 110. Bolts 114 are inserted through openings 106 of the ball joint flange and notches 118 of rotation assembly flange 97 to secure the ball joint to the rotation assembly cup 98. Other types of connections, including other rotatable joints, may be utilized to connect each rotation assembly to one of the manifold valves.

Figure 7A:
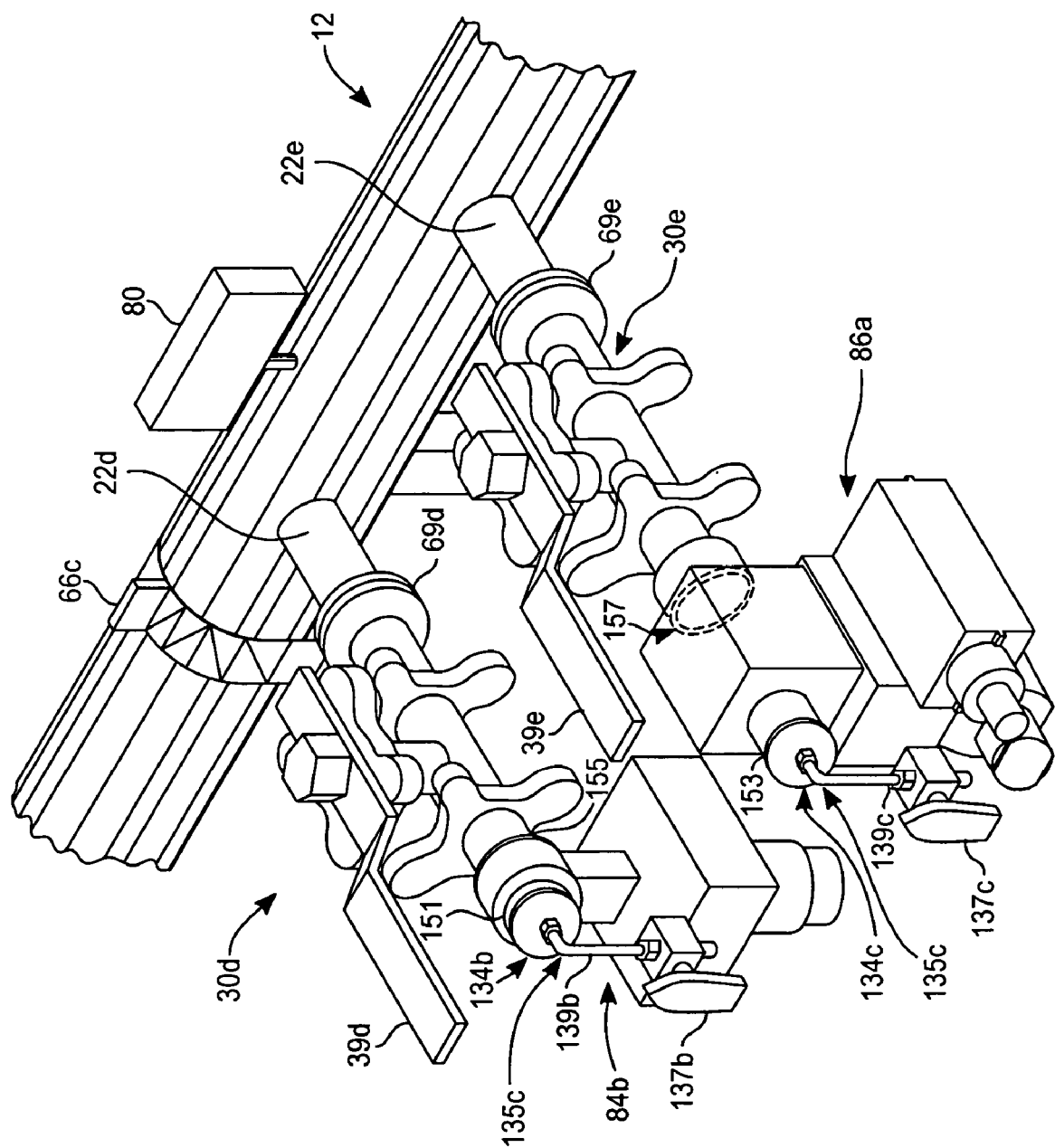
FIG. 7a is another partial perspective view of the system of FIG. 1.

Referring back to FIG. 1, pressure control valves 84a and 84b, which are depicted in representational form, are connected to manifold 12 via manifold valves 30c and 30d, respectively. With reference to FIG. 7a and FIG. 7b, the connection of pressure control valve 84b to manifold 12 is depicted in detail. Pressure control valve 84a includes the same components as and is connected to manifold 12 in the same manner as pressure control valve 84b, thus the components and connection to the manifold 12 of the chamber ball valves will be described in detail with regard to one of the pressure control valves only. The components and connection of pressure control valve 84b to manifold 12 is as follows. Pressure control valve 84b is connected to manifold valve 30d at a first opening 88 of the pressure control valve leading to an internal surface 90, seen in FIG. 7b. In addition to first opening 88, pressure control valve 84b includes a second opening 126 to the interior surface 90. The end of the pressure control valve 84b connected to the manifold valve 30d is proximate the first opening 88 of the pressure control and includes a flange 77. Manifold valve 30d also includes a flange 79 which forms a flange connection or flange joint 155 (FIG. 7a) with flange 77. The flange connection is, for example, a KF40 flange connection.

The second opening 126 of pressure control valve 84b is closed during operation of the system to prevent fluid, such as atmospheric particles, from entering the system and to allow the system to operate under vacuum. Specifically, cap 134b of cap assembly 135b closes opening 126 (FIG. 7b) during operation of the system. Cap 134b includes a flange 130, which forms a flange connection 151 (FIG. 7a) with a flange 133 located on an end of the pressure control valve 84b proximate the second opening 126, and may comprise a metallic material.

Chamber ball valves 86a and 86b, which are depicted in representational form, are connected to manifold 12 via manifold valves 30e and 30f, respectively (FIG. 1). With reference to FIG. 7a and FIG. 7b, the connection of chamber ball valve 86a to manifold 12 is depicted in detail. Chamber ball valves 86a and 86b include the same components and are connected to manifold 12 in the same manner, thus the components and connection to the manifold 12 of the chamber ball valves will be described in detail with regard to one of the chamber ball valves only. The components and connection of chamber ball valve 86a to manifold 12 is as follows. Chamber ball valve 86a is connected to manifold valve 30e at a first opening 92 of the chamber ball valve leading to an internal surface 94, seen in FIG. 7b. In addition to first opening 92, chamber ball valve 86a includes a second opening 128 to the interior surface 94. The end of the chamber ball valve 86a connected to the manifold valve 30e is proximate the first opening 92 of chamber ball valve 86a and includes a flange 93. Manifold valve includes a flange 95 which forms a flange connection, or flange joint 157 (FIG. 7a), with flange 93. The flange connection is, for example, a KF40 flange connection.

The second opening 128 of chamber ball valve 86a is closed during operation of the system to prevent fluids from escaping the system and to allow the system to operate under vacuum. Specifically, cap 134c of cap assembly 135c closes opening 128 during operation of the system. Cap 134c includes a flange 132, which forms a flange connection 153 (FIG. 7a) with a flange 135 located on an end of the chamber ball valve 86a proximate the second opening 128, and may comprise a metallic material.

Referring to FIG. 2, cap assemblies 135a–135e are seen featuring valves, caps, and tubing. Valves 137a–137e are connected to the caps 134a–134e, respectively, via tubing 139a–139e. Gas may be vented to each component through the corresponding valve 137a–137e and via the tubing elements 139a–139e, as will be described below.

Where a manifold valve lacks a connected component, as with manifold valve 30g, a cap such as cap 134e, may be used to seal an opening of the manifold valve. A cap is not required to seal an opening of the manifold valve 30g, as the valve 30g may be placed in a closed position by adjustment with handle 39g (FIG. 1) to prevent fluid, such as atmospheric particles, from entering the manifold valve.

Still referring to FIG. 2, cap assembly 135e may be removed from manifold valve 30g so that a residual gas analyzer may be connected to manifold valve 30g to analyze gas within the manifold 12.

With reference to FIG. 1, in operation of the system, components desired to undergo contaminant reduction are connected to the manifold valves. In FIG. 1, components, including for example, one of a rotation assembly 82, a pressure control valve 84, and a chamber ball valve 86, are connected to the manifold valves 30a–30f. A purge fluid, such as nitrogen gas, an inert gas, or another type of gas or other purge substance, is introduced into the manifold 12 for reducing contaminants present on the components. The following example is described with the use of nitrogen, however, other purge fluids may be used. Nitrogen gas is advantageous as a purge fluid as it assists in the removal of oxygen from surfaces of the components in the system. In one example, nitrogen is contained within the fluid source 20 at, for example, a pressure ranging from approximately 3620 Torr to 5171 Torr (70 psig to 100 psig). Supply line 28 transports the nitrogen from the nitrogen source 20 to flow regulator 70 which regulates the flow of gas to, for example, approximately 259 Torr±52 Torr (5±1 psig). The regulated nitrogen gas is transported from the nitrogen regulator 70 to the flow controller 74. From the flow controller 74, the gas is transported to the opening of capped end 16 via supply line 28. Nitrogen is introduced into the main passageway 14 as well as to the connected components via the plurality of inlets 22a–22f and manifold valves 30a–30f. In the example of FIG. 1, manifold valve 30g lacks a component, but may still be placed in fluid communication with the nitrogen, as described above. Inlets and manifold valves include passageways through which fluid is transported. Inlets 22a–22g include passageways 23a–23g, seen in FIGS. 5a–5c. With regard to manifold valves 30a, 30d and 30e, passageways are seen as elements 61, 63, and 65 (FIG. 6b and FIG. 7b), respectively. The other manifold valves include passageways which are not depicted. The fluid travels along the passageways of the inlets and manifold valves and reaches the internal surfaces of the components. With the introduction of the purge fluid under vacuum, oxygen is removed from the internal surfaces of the components. Fluid, such as oxygen gas, removed from the surfaces, is pumped out of the components 82a, 82b, 84a, 84b, 86a, and 86b, inlets 22a–22g and manifold valves 30a–30g, through the exhaust pipe 24 connected to the pump 32.

The system operates under a vacuum. In one example, the manifold pressure is 25±5 Torr (0.5±0.1 psia) and the manifold flow rate is 20±2 slm (42±4 scfh). A variety of manifold pressures and flow rates may be used, however, low pressures are typically desired.

The manifold valves 30a–30g of the system operate independently of each other to place connected components, such as components 82, 84 and 86, into and out of fluid communication with the manifold 12. Therefore, an advantage of the system of the present invention is that one component may be removed without shutting down the entire system 10. Specifically, the manifold valve 30 connected to the component to be removed may be closed such that the component is no longer in fluid communication with the connected inlet 22. The component may then be removed from the system and utilized for semiconductor device manufacturing without disrupting the vacuum.

Further, because a plurality of components may undergo contaminant reduction by the system 10 of the present invention, a set of components from, for example, one reaction chamber, may be removed after contaminant reduction while another set from another chamber, for example, are still undergoing contaminant reduction. Additionally, replacement components may be connected to the manifold 12 to replace the removed set. In this manner, components belonging to semiconductor device manufacturing equipment may efficiently undergo contaminant reduction.

When the system is in use, a vacuum environment typically exists within the system, including the manifold 12 and the connected components. Therefore, before a component is removed from the system, it is desirable that the component is slowly vented out to atmosphere. Valves connected to the rotation assemblies are opened slowly to vent out the components to atmosphere before removal. For example, valve 122, connected to rotation assembly 82a via fitting 120 (FIG. 6a–6b), is opened to vent out rotation assembly 82a. Valve 123, connected to rotation assembly 82b, is opened to vent out rotation assembly 82b. Valves 137a–137e (FIG. 1) of cap assemblies 135a–135e (FIG. 2), which are connected to pressure control valves 84a and 84b, chamber ball valves 86a and 86b, and manifold valve 30g, respectively, are opened slowly to vent out the components to atmosphere before removal or to test the composition of gas within the manifold valve 12. Before opening each of the valves, the corresponding manifold valve is closed.

While the connected components are undergoing contaminant reduction, additional components, such as o-rings, may be disposed within the oven 46 for moisture reduction and outgassing. In one example, the oven is set at 65° C. and has an oven pressure of 25±5 Torr (0.5±0.1 psia). In one example, the oven flow rate is 14.1±4.7 slm (30±10 scfh). The temperature and pressure may vary.

When the components have undergone contaminant reduction, they are removed from the system and are ready for use. In one example, the components are connected to the manifold until it is time for use. Components undergoing contaminant reduction in the system of the present invention, in one example, remain under vacuum and exposed to the purge fluid for 30–35 days. In another example, the components are stored in, for example, a nitrogen environment until it is time for use. The amount of time for which the components undergo contaminant reduction may vary.

Although certain embodiments have been described for illustration, a skilled artisan will recognize various means for accomplishing a similar purpose. For example, valve handles 39 imply manual control means for connecting components to manifold 12. However, automated, computer and state machine-controlled valve control is considered to be within a scope of the present invention. Therefore, the scope shall only be determined by way of the appended claims.

What is claimed is:

1. A system for contaminant reduction of semiconductor device fabrication equipment components, comprising:
   a manifold having a main passageway with first and second capped ends, said first capped end configured to accept a purge fluid, a plurality of inlets disposed in between said capped ends in fluid communication with said main passageway, and an exhaust fitting disposed downstream from said plurality of inlets and being in fluid communication with said main passageway;
   a plurality of manifold valves, each manifold valve having a first end connected to one of said plurality of inlets and a second end to which a semiconductor device fabrication equipment component having a contaminated surface for contaminant reduction and at least one opening is removably connectable at said at least one opening, and each manifold valve being operable to place one of said plurality of inlets into and out of fluid communication with said surface of said removably connectable component;
   a purge fluid source; and
   a pump.

2. The system of claim 1 wherein said plurality of inlets are spaced apart such that two sets of components are connectable to said manifold valves, each set including at least two different types of components.

3. The system of claim 1 further comprising a plurality of caps, each of said caps removably connectable to said second end of said manifold valves and to components having two openings.

4. The system of claim 3 wherein one of said caps is connected to one end of one of said components when another end of said one of said components is connected to one of said manifold valves.

5. The system of claim 3 wherein one of said caps is connected to said second end of one of said manifold valves in the absence of one of said components connected to said one of said manifold valves.

6. The system of claim 3 wherein one of said caps forms a flange connection with one of said components when connected to said one of said components, and a flange connection with one of said manifold valves when connected to said second end of said one of said manifold valves.

7. The system of claim 3 wherein each of said plurality of caps is connected to a cap valve.

8. The system of claim 7 wherein each of said plurality of caps is connected to said cap valve via tubing.

9. The system of claim 1 wherein at least one of said inlets is a downwardly facing inlet.

10. The system of claim 1 wherein at least one of said inlet is a frontwardly facing inlet.

11. The system of claim 1 wherein one of said components is a rotation assembly.

12. The system of claim 11 wherein said rotation assembly is connected to one of said manifold valves with a ball joint.

13. The system of claim 12 wherein said ball joint includes a ball flange, a male connector, and a flange.

14. The system of claim 11 wherein said rotation assembly is connected to one of said manifold valves with a rotatable joint.

15. The system of claim 11 wherein one of said inlets is downwardly facing and said rotation assembly is connected to said downwardly facing inlet.

16. The system of claim 1 wherein said one of said components is a chamber ball valve.

17. The system of claim 16 wherein said chamber ball valve is connected to one of said manifold valves with a flange connection.

18. The system of claim 17 wherein said flange connection is a KF40 flange joint.

19. The system of claim 16 wherein one of said inlets is frontwardly facing and said ball valve is connected to said frontwardly facing inlet.

20. The system of claim 1 wherein one of said components is a pressure control valve.

21. The system of claim 20 wherein said pressure control valve is connected to one of said manifold valves with a flange connection.

22. The system of claim 21 wherein said flange connection is a KF40 flange joint.

23. The system of claim 20 wherein one of said inlets is frontwardly facing and said pressure control valve is connected to said frontwardly facing inlet.

24. The system according to claim 1 wherein said inlets include two downwardly facing inlets and four frontwardly facing inlets.

25. The system according to claim 24 wherein said components include a pair of rotation assemblies connected to a first pair of manifold valves which are connected to said two downwardly facing inlets, a pair of pressure control valves connected to a second pair of manifold valves which are connected to two of said frontwardly facing inlets, and a pair of chamber ball valves connected to a third pair of manifold valves which are connected to another two of said frontwardly facing inlets.

26. The system according to claim 1 wherein said manifold includes six inlets, at least one of which is downwardly facing and at least one of which is frontwardly facing.

27. The system according to claim 1 wherein said components include different types of components and wherein two sets of each different type of component are connected to said manifold valves.

28. The system of claim 1 wherein one of said inlets is an analyzer port.

29. The system of claim 1 further comprising a frame supporting said manifold.

30. The system of claim 29 wherein said frame includes stirrups within which said manifold is inserted.

31. The system of claim 29 wherein said frame is steel.

32. The system of claim 29 wherein said frame comprises frame elements bolted together.

33. The system of claim 29 wherein said frame includes a base.

34. The system of claim 1 further comprising a first pipe connected to said pump and to said exhaust fitting.

35. The system of claim 34 further comprising a pipe valve disposed on said pipe.

36. The system of claim 34 further comprising an oven and a second pipe, said second pipe connected to said first pipe and to said oven.

37. The system of claim 1 wherein said fluid source is a nitrogen source.

38. The system of claim 37 wherein said nitrogen source includes nitrogen ranging from 70 psig to 100 psig.

39. The system of claim 1 wherein said fluid source is an inert fluid source.

40. The system of claim 1 further comprising a flow regulator and a flow controller, wherein said fluid source is connected to said flow regulator and said flow controller is connected to said flow regulator and said opening in said capped end.

41. The system of claim 40 further comprising a fluid supply line connecting said fluid source to said flow regulator, connecting said flow regulator to said flow controller, and connecting said flow controller to said opening in said capped end.

42. The system of claim 40 wherein said flow regulator supplies fluid to said flow controller at approximately 5 psig.

43. The system of claim 1 further comprising an oven connected to said pump.

44. The system of claim 43 further comprising o-rings disposed in said oven for outgassing.

45. The system of claim 43 further comprising an oven controller.

46. The system of claim 1 further comprising a pump controller.

47. The system of claim 1 wherein said exhaust fitting is disposed proximate to said capped ends.

48. The system of claim 1 wherein said at least one opening of said semiconductor device fabrication equipment component leads to said surface for contaminant reduction.

49. The system of claim 1 wherein said surface for contaminant reduction is an internal surface.

50. An apparatus for contaminant reduction of semiconductor device fabrication equipment components, comprising:
a manifold closed at one end and configured to accept a purge fluid at another end, a fluid passageway, a plurality of inlets, and a fluid exhaust fitting disposed downstream from said inlets, said inlets and said fluid exhaust fitting in fluid communication with said fluid passageway; and
a plurality of manifold valves, each manifold valve being connected to one of said plurality of inlets and to each of which a semiconductor device fabrication equipment component having a surface for contaminant reduction is removably connectable, wherein said manifold valves are operable to place said removably connectable components into and out of fluid communication with said plurality of inlets.

51. The apparatus of claim 50 further comprising a plurality of caps, each of said caps removably connectable to said second end of said manifold valves and to at least one of said components.

52. The apparatus of claim 51 wherein one of said caps is connected to one end of one of said components when another end of said one of said components is connected to one of said manifold valves.

53. The apparatus of claim 51 wherein one of said caps is connected to said second end of one of said manifold valves in the absence of one of said components connected to said one of said manifold valves.

54. The apparatus of claim 51 wherein one of said caps forms a flange connection with one of said components when connected to said one of said components, and a flange connection with one of said manifold valves when connected to said second end of said one of said manifold valves.

55. The apparatus of claim 51 wherein each of said plurality of caps is connected to a cap valve.

56. The apparatus of claim 55 wherein each of said plurality of caps is connected to said cap valve via tubing.

57. The apparatus of claim 50 wherein at least one of said inlets is a downwardly facing inlet.

58. The apparatus of claim 57 wherein one of said components is a rotation assembly.

59. The apparatus of claim 58 wherein said rotation assembly is connected to one of said manifold valves with a ball joint.

60. The apparatus of claim 50 wherein at least one of said inlets is a frontwardly facing inlet.

61. The apparatus of claim 60 wherein said one of said components is a chamber ball valve.

62. The apparatus of claim 61 wherein said chamber ball valve is connected to one of said manifold valves with a flange connection.

63. The apparatus of claim 60 wherein said components include a pressure control valve.

64. The apparatus of claim 63 wherein said pressure control valve is connected to one of said manifold valves with a flange connection.

65. The apparatus of claim 50 wherein each of said semiconductor device fabrication equipment components includes an opening for connection to one of said manifold valves.

66. The apparatus of claim 65 wherein each of said semiconductor device fabrication equipment component openings leads to an inner surface for contaminant reduction, said inner surface placed into and out of fluid communication with one of said plurality of inlets.

67. A system for contaminant reduction of semiconductor device fabrication equipment components, comprising:
a manifold having a main passageway with first and second capped ends, said first capped end configured to accept a purge fluid, a plurality of inlets disposed in between said capped ends in fluid communication with said main passageway, and an exhaust fitting disposed downstream from said plurality of inlets and being in fluid communication with said main passageway;
a rotation assembly having a contaminated surface;
an equipment valve having a contaminated surface and first and second openings;
a plurality of manifold valves, one of said manifold valves having a first end connected to one of said inlets and a second end connected to said rotation assembly, and another of said manifold valves having a first end connected to another of said inlets and a second end connected to said equipment valve at said first opening;
a cap connected to said equipment valve at said second opening;
a purge fluid source; and
a pump configured to be coupled to said exhaust fitting.

68. The system of claim 67 further comprising a ball joint connecting said rotation assembly to one of said manifold valves and a flange connection connecting said equipment valve to another of said manifold valves.

69. The system of claim 67 wherein said equipment valve is a chamber ball valve.

70. The system of claim 67 wherein said equipment valve is a pressure control valve.

71. The system of claim 67 wherein said system is under vacuum.

72. The system of claim 67 wherein at least one of said plurality of inlets is downwardly facing and at least one of said plurality or inlets is frontwardly facing.

73. The system of claim 72 wherein said first end of said one of said manifold valves is connected to one of said downwardly facing inlets and said first end of said another manifold valve is connected to one of said frontwardly facing inlets.

74. A system for contaminant reduction of semiconductor device fabrication equipment components, comprising:
a manifold having a main passageway with first and second capped ends, said first capped end configured to accept a purge fluid, a plurality of inlets disposed in between said capped ends in fluid communication with said main passageway, and an exhaust fitting disposed downstream from said plurality of inlets and being in fluid communication with said main passageway;
a plurality of means operable to place said plurality of inlets into and out of fluid communication with semiconductor device fabrication equipment components removably connectable to said manifold,
a fluid means for providing a purge fluid to said first capped end; and
a pressure reduction means for providing a reduced pressure within said manifold, said pressure reduction means configured to be coupled to said exhaust fitting.

75. A method for reducing contaminants of semiconductor device fabrication equipment components, each component having a contaminated surface, with a manifold having a main passageway with first and second capped ends, said first capped end configured to accept a purge fluid source, a plurality of inlets disposed in between said capped ends in fluid communication with said main passageway, and an exhaust fitting configured to accept a pump, said exhaust fitting disposed downstream from said plurality of inlets and in fluid communication with said main passageway, comprising:
providing said manifold;
connecting a purge fluid source to said first capped end;
connecting a pump to said exhaust fitting;
connecting at least one semiconductor device fabrication equipment component to at least one of said plurality of inlets;
releasing a purge fluid into said manifold;
placing said at least one component in fluid communication with said at least one of said plurality of inlets;
contacting said contaminated surface of said at least one component with said purge fluid surface; and
pumping fluid from said manifold.

76. The method of claim 75 further comprising placing said at least one component out of fluid communication with said manifold.

77. The method of claim 75 further comprising removing said at least one component from said manifold.

78. The method of claim 75 wherein the step of connecting at least one component to at least one of said plurality of inlets occurs at an opening of said at least one component.

79. The method of claim 75 wherein said surface for cleaning is an internal surface.

80. The method of claim 75 wherein contacting said contaminated surface with said purge fluid occurs under vacuum.

* * * * *